United States Patent
Schulz et al.

(10) Patent No.: US 9,056,564 B2
(45) Date of Patent: Jun. 16, 2015

(54) ADJUSTING DEVICE, PARTICULARLY FOR A VEHICLE SEAT

(75) Inventors: Dirk Schulz, Remscheid (DE); Stefan Haida, Remscheid (DE)

(73) Assignee: Johnson Controls Technology Company, Holland, MI (US)

( * ) Notice: Subject to any disclaimer, the term of this patent is extended or adjusted under 35 U.S.C. 154(b) by 594 days.

(21) Appl. No.: 13/055,460

(22) PCT Filed: Jul. 24, 2009

(86) PCT No.: PCT/EP2009/005386
§ 371 (c)(1),
(2), (4) Date: Mar. 29, 2011

(87) PCT Pub. No.: WO2010/009893
PCT Pub. Date: Jan. 28, 2010

(65) Prior Publication Data
US 2011/0169313 A1 Jul. 14, 2011

(30) Foreign Application Priority Data
Jul. 24, 2008 (DE) .......................... 10 2008 034 800

(51) Int. Cl.
*B60N 2/225* (2006.01)
(52) U.S. Cl.
CPC ............ *B60N 2/2257* (2013.01); *B60N 2/2251* (2013.01)
(58) Field of Classification Search
CPC .............................. B60N 2/1655; B60N 2/2257

USPC ........................................ 192/223.2; 475/900
See application file for complete search history.

(56) References Cited

U.S. PATENT DOCUMENTS

| | | | | |
|---|---|---|---|---|
| 2,964,930 A | * | 12/1960 | Aira et al. | 192/209 |
| 4,211,451 A | | 7/1980 | Shephard | |
| 6,508,347 B1 | * | 1/2003 | Hochmuth | 192/44 |
| 2005/0245348 A1 | | 11/2005 | Liu | |
| 2007/0068760 A1 | * | 3/2007 | Klopp et al. | 192/15 |
| 2007/0137965 A1 | * | 6/2007 | Yamada et al. | 192/223.2 |
| 2010/0139425 A1 | * | 6/2010 | Schulz et al. | 475/331 |

FOREIGN PATENT DOCUMENTS

| | | |
|---|---|---|
| CN | 1849463 | 10/2006 |
| DE | 3201309 A1 | 7/1983 |
| DE | 10 2007 017617 A1 | 5/2008 |
| WO | 2005 024264 A | 3/2005 |
| WO | 2008052761 A1 | 3/2008 |

OTHER PUBLICATIONS

International Search Report for application No. PCT/EP2009/00005386 mailed Nov. 20, 2009.
Office Action dated Oct. 28, 2013 in counterpart Korean Application No. 10-2011-7004352.

* cited by examiner

*Primary Examiner* — Rodney H Bonck
(74) *Attorney, Agent, or Firm* — Fletcher Yoder, P.C.

(57) ABSTRACT

An adjusting device is disclosed for performing at least one adjusting function, such as in a vehicle seat. The device comprises a drive having a drive means and an output, a braking device that generally prevents torque from the output acting on the drive means. At least one spring is arranged between the drive and the braking device.

4 Claims, 4 Drawing Sheets

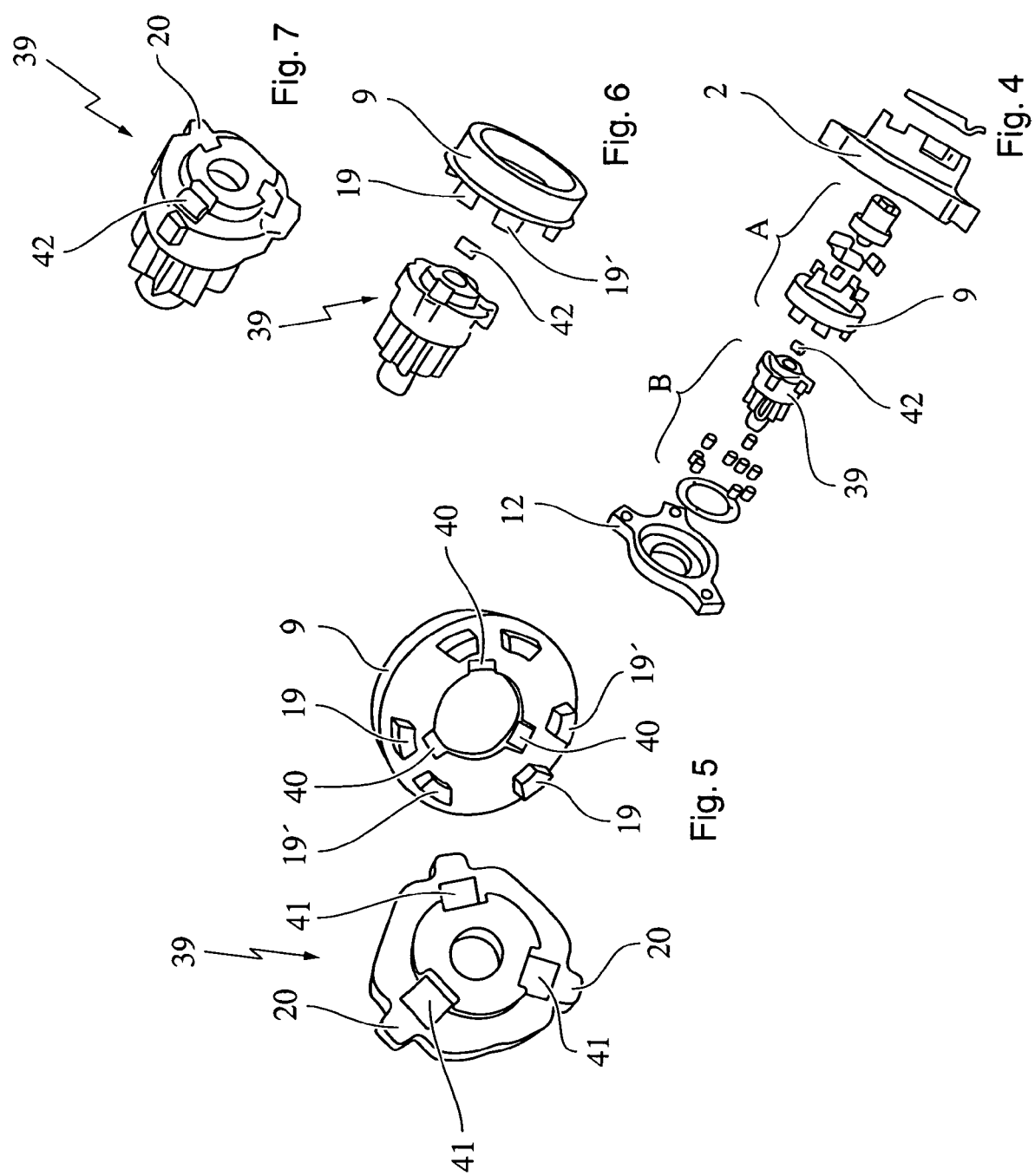

ADJUSTING DEVICE, PARTICULARLY FOR A VEHICLE SEAT

CROSS REFERENCE TO RELATED APPLICATIONS

Figure 1:
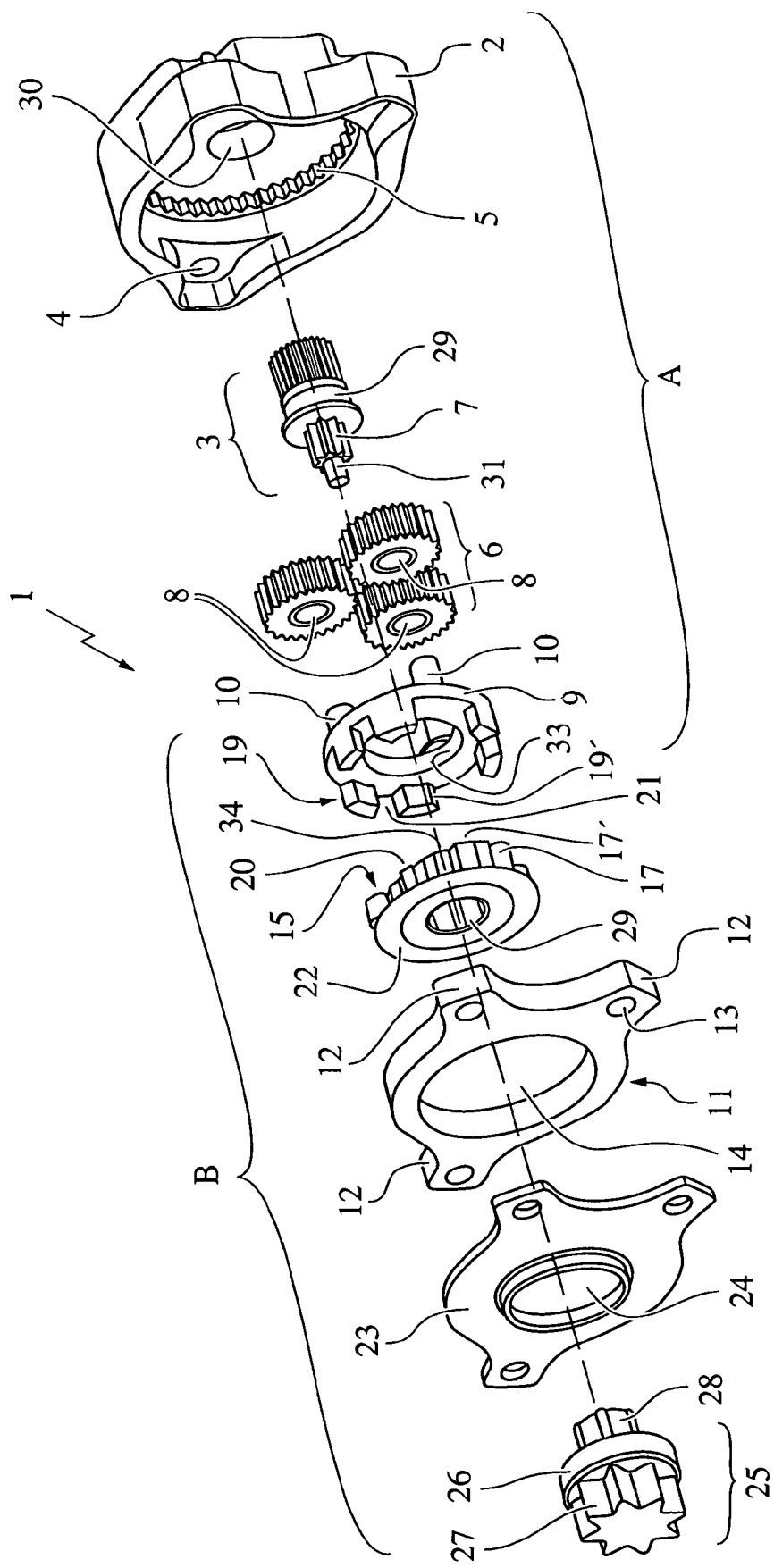

This application claims priority from and the benefit of PCT Application No. PCT/EP2009/005386, filed on Jul. 24, 2009 and German Patent No. DE 10 2008 034 800.7, filed on Jul. 24, 2008; both entitled "Adjusting Device, Particularly for a Vehicle Seat", which are herein incorporated by reference.

BACKGROUND

The invention relates to an adjusting device for performing at least one adjusting function, particularly for adjusting a motor vehicle seat, having a drive, which has a drive means and an output, and a braking device, which very largely prevents any torques from the output acting on the drive means.

Adjusting devices of this kind are known, for example, from U.S. Pat. No. 4,211,451, DE 32 01 309 and US 2005/0245348 A1 and are suitable for electric or, preferably, manual actuation of a device for adjusting the height of a motor vehicle seat, for example. In this case, the adjusting device converts an input drive torque into a higher output torque, which is used for angular adjustment of components connected thereto, e.g. of the seat height adjuster. In order at least to reduce torques from the drive unit acting on the planetary gear, the adjusting devices have braking devices. However, the adjusting devices known from the prior art are of comparatively complex construction and/or are difficult to assemble. Another disadvantage is that the number of actuations of the adjusting device for the desired adjustment travel is too great.

It was therefore the object of the present invention to make available an adjusting device which does not have the disadvantages of the prior art.

SUMMARY

The object is achieved by means of an adjusting device for performing at least one adjusting function, particularly for adjusting a motor vehicle seat, having a drive, which has a drive means and an output, and a braking device, which very largely prevents any torques from the output acting on the drive means, wherein at least one spring means is arranged between the drive and the braking device.

With the adjusting device according to the invention, it is possible to perform any desired adjustments at an adjusting mechanism. However, the adjusting device according to the invention is preferably used to adjust a motor vehicle seat. For example, the adjusting system according to the invention can be used to vary the height of the seat surface, the slope of the backrest relative to the seat surface and the shape of the seat. The adjusting system according to the invention can be driven either manually or by motor. The adjusting device according to the invention is of simpler construction than adjusting devices in accordance with the prior art and is easier to manufacture. With the adjusting device according to the invention, the same adjustment travel is achieved with a smaller number of actuations.

By means of the braking device, torques from the output acting on the drive are at least partially and preferably completely eliminated. The braking device preferably acts in two directions of rotation.

According to the invention, the adjusting device has at least one and preferably more spring means between the drive and the braking device. Any spring means known to a person skilled in the art which reassumes its original shape after an elastic deformation may be considered as spring means. The spring means can be manufactured from plastic and/or steel.

The spring means preferably moves the drive back into a starting position after each actuation, particularly preferably immediately after each actuation. During this process, the spring means preferably decouples the drive from the braking device. By virtue of this preferred embodiment, the adjusting device according to the invention has less free play. Moreover, the risk of the braking device unlocking itself is at least prevented.

In a preferred embodiment, the drive has an actuator, and the braking device has a braking part. The spring means is arranged between them. During a movement, preferably a rotation, of the actuator, which the braking means does not accompany, at least not in full, the spring means is deformed. As soon as the driving force disappears, the spring means moves the actuator and/or the braking means back into the starting position thereof, in which they are, in particular, no longer in engagement with one another.

The spring means is preferably mounted with nonpositive and/or positive engagement in the actuator and/or in the braking part. This is accomplished, in particular, by means of recesses which are situated in the actuator and/or the braking part and which each partially accommodate the spring means.

The braking device preferably acts in two directions of rotation.

DRAWINGS

The invention is explained below with reference to FIGS. 1-7. These explanations are given purely by way of example and do not restrict the general inventive concept.

Figure 2:
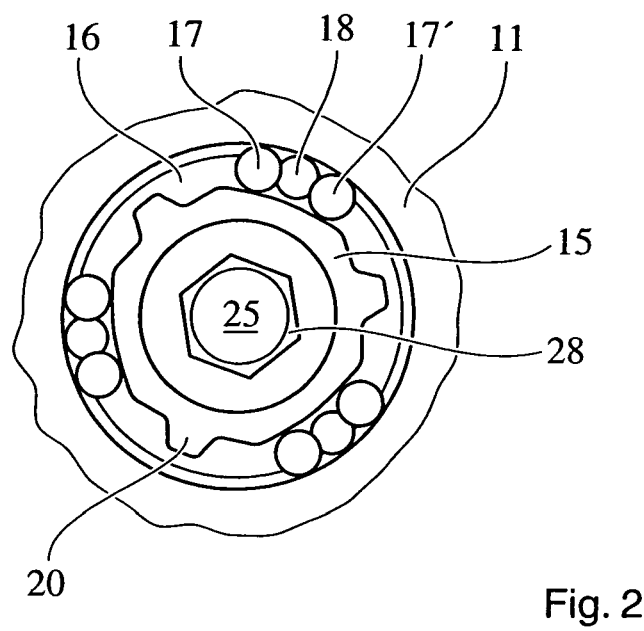
Figure 3:
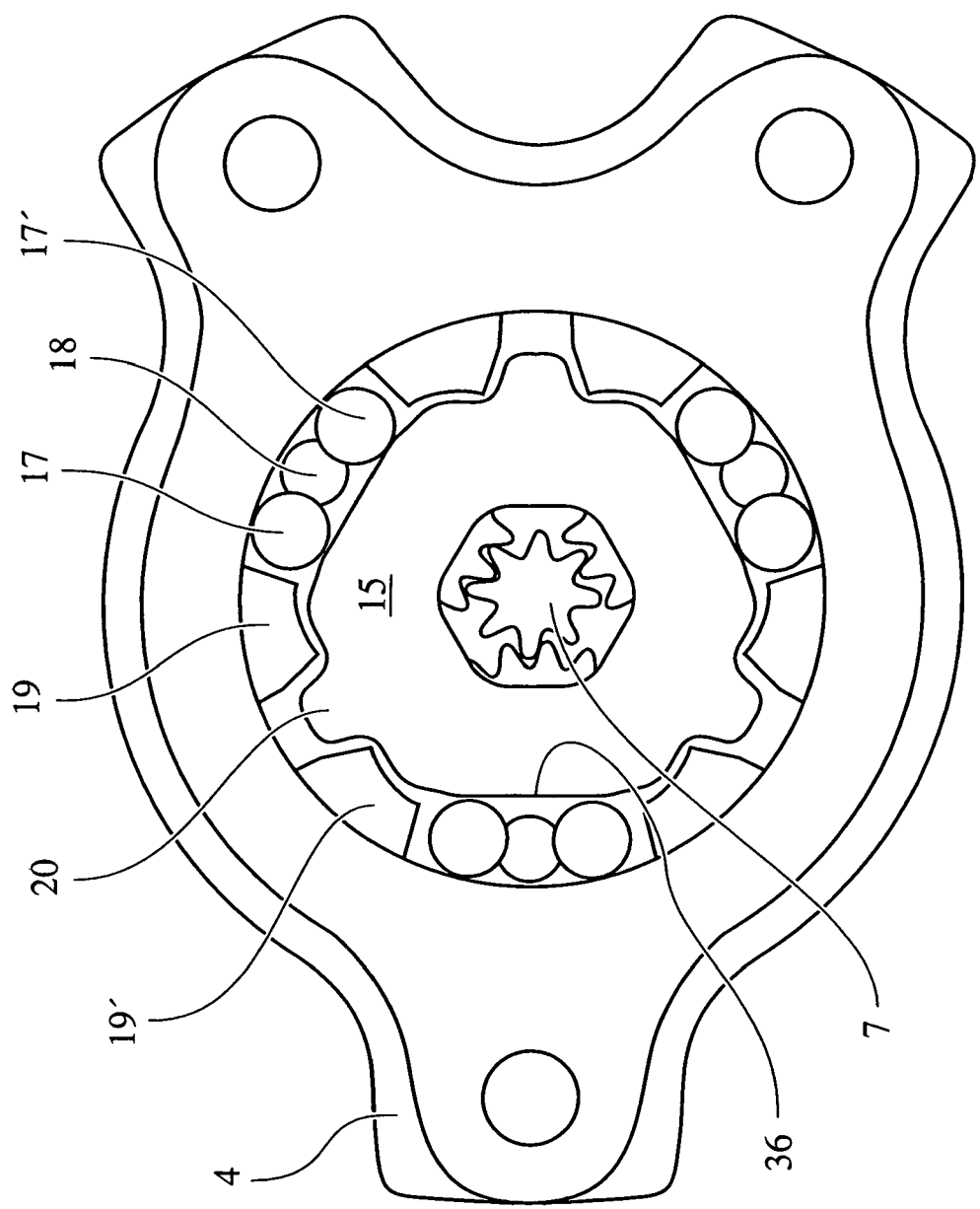

FIG. 1 shows an exploded drawing of an adjusting device.
FIG. 2 shows the braking device.
FIG. 3 shows the interaction between the braking device and the drive.
FIG. 4 shows an exploded drawing of the adjusting device according to the invention.
FIG. 5 shows details of the actuator and of the braking part.
FIG. 6 shows the spring means between the actuator and the braking part.
FIG. 7 shows how the spring means is arranged in the braking part.

DETAILED DESCRIPTION

The adjusting device 1 illustrated schematically and by way of example in the following figures has a ribbed housing 2 made of plastic 2, for example, from which the drive shaft 3, which is provided with a fine toothing and is supported in the housing 2, projects. A hand wheel for manual actuation of the adjusting device 1 can be mounted subsequently on this toothing, or a motor can be connected thereto. The housing 2 furthermore has holes 4 for attachment of the adjusting device 1 to the lateral member of the metal structure of a seat part, for example. The housing 2 is provided on the inside with an internal toothing 5, which extends coaxially with respect to the drive shaft 3 and in which three planetary gearwheels 6 revolve around an external toothing 7 on the drive shaft 3, said toothing projecting into the housing 2. As the drive shaft 3 rotates, the axes 8 of the planetary gearwheels 6 thus orbit on a circular path in the housing 2 at a lower speed of revolution than the drive shaft 3. The drive shaft 3 can have a compensation means, e.g. a compensation ring, by means of which manufacturing tolerances are compensated, noise is reduced and/or a perceptible resistance to rotation is produced. The rotation of the drive shaft 3 is received by an annular planet carrier 9, which can be rotated coaxially with respect to the drive shaft 3. Parallel to its axis of rotation, the planet carrier has journal pins 10 projecting from the axial surface thereof in the direction of the planetary gearwheels 6. The planetary gearwheels 6 are rotatably mounted on these journal pins 10. The components (subassembly A) described above thus form a planetary gear. The planetary gear can be rotated in two directions of rotation.

The planet carrier 9 is the interface with a braking device (subassembly B) of the one-way clutch type, which is intended to isolate the planetary gear (subassembly A) as fully as possible from torques acting on the adjusting device 1 from the output side. These torques can act in two directions of rotation. The subassembly 13 comprises a brake ring 11 punched out of a steel sheet, which has outward-extending lugs 12. The brake ring 11 is pushed into the housing 2, which has a complementary shape, with holes 13 in the lugs 12 coinciding with holes 4 in the housing 2. The brake ring 11 is furthermore provided with a circular aperture 14, which is coaxial with the drive shaft 3 and accommodates the inner ring 15 of the braking device.

Arranged in the gap 16 between the brake ring 11 and the inner ring 15 are pairs of cylindrical rolling contact elements 17, 17', the rolling contact elements 17, 17' of each pair being spread apart by an elastomer body 18 situated therebetween and acting as a spring means. However, a person skilled in the art will realize that this can be any other spring means, e.g. a spiral spring. The outer circumference of the inner ring 15 is configured in such a way that the gap 16 is larger in the region of each elastomer block 18 than the diameter of the rolling contact elements 17, 17', which are similar, but narrows in the direction away from the elastomer block 18 to a height less than the diameter of the rolling contact elements 17, 17'. Each pair of rolling contact elements 17, 17' is thus trapped in a partial area of the gap 16. When the inner ring 15 is rotated relative to the brake ring 11, one rolling contact element 17 of each pair is jammed in the narrowing region of the gap 16 owing to a spiral geometry 36 on the inner ring 15 in the direction of the rolling contact element 17, 17', with the result that further rotation is prevented. When the inner ring 15 is rotated in the opposite direction, jamming is accomplished by means of the other rolling contact element 17' of the pair. This prevents the significant torques which occur in the case of an accident from being transmitted to the planetary gear.

On its side facing away from subassembly A, the planet carrier 9 is equipped with pairs of projections 19, 19', which project between the pairs of rolling contact elements 17, 17' and into the gap 16. The interspaces 21 between each pair of projections 19, 19' interact, subject to play, with bosses 20 on the outer circumference of the inner ring 15, while those surfaces of the projections 19, 19' which face away from the interspaces 21 act alternately on the rolling contact elements 17, 17' when the inner ring 15 is rotated. When the inner ring 15 is rotated, the jammed rolling contact elements 17, 17' are thereby released first of all, with the play between the projections 19 of each pair and the bosses 20 being used up. As soon as each projection 19 is resting against the associated boss 20, a torque is transmitted directly from the planet carrier 9 to the inner ring 15. During rotation in the opposite direction, this takes place in a corresponding way through contact between the bosses 20 and projections 19'.

Arranged on the inner ring 15, on the side facing away from subassembly A, is a thrust washer 22, which rotates with the inner ring 15 and rests against the housing cover 23. The outer contour of the housing cover 23, which can be locked to the housing 2, is designed to be congruent with the brake ring 11, thus allowing them to be inserted into the housing 2 in the same way. The housing cover 23 is provided with a rim hole 24, which is aligned coaxially with respect to the drive shaft 2 and in which the output shaft 25 is supported. In this case, the housing cover is preferably manufactured from a metallic material. However, the housing cover can be manufactured from plastic if it is required only for protection. The housing cover is mounted with positive and/or nonpositive engagement on the preassembled unit, being screwed or riveted on, for example. However, the cover 23 is preferably mounted on the housing 4 by means of a quick-release fastener, e.g. a snap fastener. The output shaft 25, which extends coaxially with respect to the drive shaft 3, has a cylindrical region 26 suitable for support, adjoining which toward the outside is the output pinion 27. On the opposite side, the output shaft 25 is provided with a polygonal profile 28, which engages without play in an aperture 29 of complementary configuration in the inner ring 15. A person skilled in the art will realize that the output shaft 25 and the inner ring 15 can be embodied in one piece.

When the adjusting device 1 is actuated, the drive torque is thus transmitted via the drive shaft 3, the planetary gearwheels 6 and the planet carrier 9 to the inner ring 15 and, from there, to the output pinion 25. A torque acting from the output side is transmitted via the output shaft 25 to the inner ring 15 and is then taken by the brake ring 11 through the jamming of the rolling contact elements 17 or 17'. The planet carrier 9, the planetary gearwheels 6 and the housing 2 are thereby relieved of load and can be given correspondingly weaker dimensions. This adjusting device is described in detail in patent application DE 10 2007 017 617.3, which is incorporated herewith as a reference and thus counts as part of the disclosure.

FIG. 4 shows an embodiment of the adjusting device according to the invention which is based on the adjusting device in accordance with FIGS. 1-3, and a person skilled in the art will realize that the adjusting device according to the invention is not limited to this embodiment but includes any adjusting device which has a drive part and a braking part. From FIG. 4, it can be seen that a spring means is arranged between the drive A and the braking device B. In particular, the drive unit A has an actuator 9, and the braking device B has a braking part 39.

The spring means 42 is arranged between these two parts 9, 39. As soon as a torque is exerted on the actuator 9, the spring means 42 is deformed elastically until the positive and/or nonpositive engagement means 19, 19' of the actuator 9 is resting against the positive and/or nonpositive engagement means 20 of the braking part 39. As soon as there is no longer a torque being applied to the actuator 9, the actuator, in particular, is moved back into its starting position and the means 19, 19' thus no longer rests against the means 20.

FIG. 5 shows details of the actuator 9 and of the braking part 39. It is clearly apparent that both have recesses 40 and 41, respectively, each of which at least partially accommodate the spring means 42.

FIG. 6 once again shows the actuator 9 and the braking part 39 and the spring means 42 arranged therebetween.

FIG. 7 shows how the spring means 42 is fitted into the braking part 39. The spring means 42 is fitted into the recess 40 in the actuator 9 in a similar manner.

LIST OF REFERENCE SYMBOLS 1 adjusting device
2 housing 3 drive means, drive shaft
4 hole
5 internal toothing
6 planetary gearwheel
7 external toothing
8 axis
9 planet carrier, actuator
10 journal pin
11 brake ring
12 lug
13 hole
14 aperture
15 inner ring
16 gap
17, 17' rolling contact element, braking element
18 elastomer block, spring means
19, 19' projection, recess, positive and/or nonpositive engagement means
20 boss, depression, positive and/or nonpositive engagement means
21 interspace
22 thrust washer
23 housing cover
24 rim hole
25 output shaft
26 cylindrical region,
output real
28 polygonal profile
29 cylindrical area
30 hole
31 pin
32 hole
33 inner circumference
34 annular projection
35 compensation means, compensation ring
36 driver geometry, spiral geometry
37 shoulder
38 projection, nose
39 braking part
40 recess
41 recess
42 spring means
A planetary gear, drive
B braking device

The invention claimed is:

1. An adjusting device for performing at least one adjusting function, particularly for adjusting a motor vehicle seat comprising:
a drive, which has a drive device, an actuator, a plurality of planetary gears rotatably coupled to the actuator, and an output, wherein the drive device provides torque to the output via the plurality of planetary gears;
a braking device configured to interact with the actuator, wherein the braking device at least partially blocks torque of the output from acting on the drive device; and
at least one spring device arranged between the drive and the braking device, wherein the braking device comprises a braking part, the at least one spring device is arranged between the actuator and the braking device, the actuator comprises a first recess, the braking part comprises a second recess, the at least one spring device is disposed within the first recess and the second recess, and the adjusting device does not include a rolling contact element arranged between the drive and the braking device;
wherein while a torque is exerted on the actuator, the at least one spring device is deformed elastically until a first engagement device of the actuator rests against a second engagement device of the braking part, and while the torque is not exerted on the actuator, the first engagement device is in a starting position and does not rest against the second engagement device and the at least one spring device is not deformed elastically.

2. The adjusting device as claimed in claim 1, wherein the spring device is configured to move the drive back into the starting position after each actuation.

3. The adjusting device as claimed in claim 1, wherein the spring device is mounted such that in the starting position a third engagement device of the actuator does not rest against the second engagement device of the braking part.

4. The adjusting device as claimed in claim 1, wherein the braking device acts in two directions of rotation.

* * * * *